US011836069B2

(12) United States Patent
Balasubramanian et al.

(10) Patent No.: US 11,836,069 B2
(45) Date of Patent: Dec. 5, 2023

(54) METHODS AND SYSTEMS FOR ASSESSING FUNCTIONAL VALIDATION OF SOFTWARE COMPONENTS COMPARING SOURCE CODE AND FEATURE DOCUMENTATION

(71) Applicant: Open Weaver Inc., Miami, FL (US)

(72) Inventors: Ashok Balasubramanian, Chennai (IN); Karthikeyan Krishnaswamy Raja, Chennai (IN); Arul Reagan S, Chengalpattu (IN); Lakshmipathy Ganesh Eswaran, Chennai (IN)

(73) Assignee: Open Weaver Inc., Miami, FL (US)

( * ) Notice: Subject to any disclaimer, the term of this patent is extended or adjusted under 35 U.S.C. 154(b) by 4 days.

(21) Appl. No.: 17/677,801

(22) Filed: Feb. 22, 2022

(65) Prior Publication Data

US 2022/0269580 A1 Aug. 25, 2022

Related U.S. Application Data

(60) Provisional application No. 63/153,218, filed on Feb. 24, 2021.

(51) Int. Cl.
*G06F 11/36* (2006.01)
*G06F 8/41* (2018.01)
*G06F 8/73* (2018.01)

(52) U.S. Cl.
CPC .......... *G06F 11/3616* (2013.01); *G06F 8/427* (2013.01); *G06F 8/73* (2013.01)

(58) Field of Classification Search
CPC ......... G06F 11/3616; G06F 8/427; G06F 8/73
See application file for complete search history.

(56) References Cited

U.S. PATENT DOCUMENTS

| 5,953,526 A | 9/1999 | Day et al. |
| 7,322,024 B2 | 1/2008 | Carlson et al. |

(Continued)

FOREIGN PATENT DOCUMENTS

| CN | 108052442 A | 5/2018 |
| KR | 10-2020-0062917 | 6/2020 |

(Continued)

OTHER PUBLICATIONS

Iderli Souza, An Analysis of Automated Code Inspection Tools for PHP Available on Github Marketplace, Sep. 2021, pp. 10-17 (Year: 2021).*

(Continued)

*Primary Examiner* — Wei Y Zhen
*Assistant Examiner* — Amir Soltanzadeh
(74) *Attorney, Agent, or Firm* — Foley & Lardner LLP (57) ABSTRACT

Systems and methods for automatic validation of software components comparing source code and feature documentation are provided herein. An exemplary method includes assessing functional validation of software components by comparing the claimed features of software components against the features extracted from their source code. To prevent the issue of having to try unverified software components the present disclosure provides a solution that uses machine learning to extract claimed features of a software component and its actual features that are implemented in its source code. Then, for evaluating the software components, the disclosed solution compares the claimed features of software components against the features extracted from their source code to give a validated score to the developer so that the developer can easily decide on choosing the validated software.

20 Claims, 8 Drawing Sheets

(56) References Cited

U.S. PATENT DOCUMENTS

| | | | |
|---|---|---|---|
| 7,703,070 B2 | 4/2010 | Bisceglia | |
| 7,774,288 B2 | 8/2010 | Acharya et al. | |
| 7,958,493 B2 | 6/2011 | Lindsey et al. | |
| 8,010,539 B2 | 8/2011 | Blair-Goldensohn et al. | |
| 8,051,332 B2 | 11/2011 | Zakonov et al. | |
| 8,112,738 B2 | 2/2012 | Pohl et al. | |
| 8,112,744 B2 | 2/2012 | Geisinger | |
| 8,219,557 B2 | 7/2012 | Grefenstette et al. | |
| 8,296,311 B2 | 10/2012 | Rapp et al. | |
| 8,412,813 B2 | 4/2013 | Carlson et al. | |
| 8,417,713 B1 | 4/2013 | Blair-Goldensohn et al. | |
| 8,452,742 B2 | 5/2013 | Hashimoto et al. | |
| 8,463,595 B1 | 6/2013 | Rehling et al. | |
| 8,498,974 B1 | 7/2013 | Kim et al. | |
| 8,627,270 B2 | 1/2014 | Fox et al. | |
| 8,677,320 B2 | 3/2014 | Wilson et al. | |
| 8,688,676 B2 | 4/2014 | Rush et al. | |
| 8,838,606 B1 | 9/2014 | Cormack et al. | |
| 8,838,633 B2 | 9/2014 | Dhillon et al. | |
| 8,935,192 B1 | 1/2015 | Ventilla et al. | |
| 8,943,039 B1 | 1/2015 | Grieselhuber et al. | |
| 9,015,730 B1 | 4/2015 | Allen et al. | |
| 9,043,753 B2 | 5/2015 | Fox et al. | |
| 9,047,283 B1 | 6/2015 | Zhang et al. | |
| 9,135,665 B2 | 9/2015 | England et al. | |
| 9,176,729 B2 | 11/2015 | Mockus et al. | |
| 9,201,931 B2 | 12/2015 | Lightner et al. | |
| 9,268,805 B2 | 2/2016 | Crossley et al. | |
| 9,330,174 B1 | 5/2016 | Zhang | |
| 9,361,294 B2 * | 6/2016 | Smith | G06F 40/58 |
| 9,390,268 B1 | 7/2016 | Martini et al. | |
| 9,471,559 B2 | 10/2016 | Castelli et al. | |
| 9,589,250 B2 | 3/2017 | Palanisamy et al. | |
| 9,626,164 B1 * | 4/2017 | Fuchs | G06F 11/3664 |
| 9,672,554 B2 | 6/2017 | Dumon et al. | |
| 9,977,656 B1 | 5/2018 | Mannopantar et al. | |
| 10,484,429 B1 | 11/2019 | Fawcett et al. | |
| 10,761,839 B1 * | 9/2020 | Migoya | G06F 8/427 |
| 10,922,740 B2 | 2/2021 | Gupta et al. | |
| 11,474,817 B2 | 10/2022 | Sousa et al. | |
| 2001/0054054 A1 | 12/2001 | Olson | |
| 2002/0059204 A1 | 5/2002 | Harris | |
| 2002/0150966 A1 | 10/2002 | Muraca | |
| 2002/0194578 A1 | 12/2002 | Irie et al. | |
| 2004/0243568 A1 | 12/2004 | Wang et al. | |
| 2006/0090077 A1 | 4/2006 | Little et al. | |
| 2006/0200741 A1 | 9/2006 | Demesa et al. | |
| 2006/0265232 A1 | 11/2006 | Katariya et al. | |
| 2007/0050343 A1 | 3/2007 | Siddarampappa et al. | |
| 2007/0185860 A1 | 8/2007 | Lissack | |
| 2007/0234291 A1 | 10/2007 | Ronen et al. | |
| 2007/0299825 A1 | 12/2007 | Rush et al. | |
| 2009/0043612 A1 | 2/2009 | Szela et al. | |
| 2009/0319342 A1 | 12/2009 | Shilman et al. | |
| 2010/0106705 A1 | 4/2010 | Rush | |
| 2010/0121857 A1 | 5/2010 | Elmore et al. | |
| 2010/0174670 A1 | 7/2010 | Malik et al. | |
| 2010/0205198 A1 | 8/2010 | Mishne et al. | |
| 2010/0205663 A1 | 8/2010 | Ward et al. | |
| 2010/0262454 A1 | 10/2010 | Sommer et al. | |
| 2011/0231817 A1 | 9/2011 | Hadar et al. | |
| 2012/0143879 A1 | 6/2012 | Stoitsev | |
| 2012/0259882 A1 | 10/2012 | Thakur et al. | |
| 2012/0278064 A1 | 11/2012 | Leary et al. | |
| 2013/0103662 A1 | 4/2013 | Epstein | |
| 2013/0117254 A1 | 5/2013 | Manuel-Devadoss et al. | |
| 2014/0040238 A1 | 2/2014 | Scott et al. | |
| 2014/0075414 A1 | 3/2014 | Fox et al. | |
| 2014/0163959 A1 | 6/2014 | Hebert et al. | |
| 2014/0188746 A1 | 7/2014 | Li | |
| 2014/0297476 A1 | 10/2014 | Wang et al. | |
| 2014/0337355 A1 | 11/2014 | Heinze | |
| 2015/0127567 A1 | 5/2015 | Menon et al. | |
| 2015/0220608 A1 | 8/2015 | Crestani Campos et al. | |
| 2015/0331866 A1 | 11/2015 | Shen et al. | |
| 2016/0253688 A1 | 9/2016 | Nielsen et al. | |
| 2016/0350105 A1 | 12/2016 | Kumar et al. | |
| 2016/0378618 A1 * | 12/2016 | Cmielowski | G06F 11/1479 714/38.1 |
| 2017/0034023 A1 | 2/2017 | Nickolov et al. | |
| 2017/0220633 A1 | 8/2017 | Porath et al. | |
| 2017/0286541 A1 | 10/2017 | Mosley et al. | |
| 2018/0046609 A1 * | 2/2018 | Agarwal | G06F 3/0482 |
| 2018/0067836 A1 | 3/2018 | Apkon et al. | |
| 2018/0114000 A1 | 4/2018 | Taylor | |
| 2018/0329883 A1 | 11/2018 | Leidner et al. | |
| 2019/0278933 A1 | 9/2019 | Bendory et al. | |
| 2019/0311044 A1 | 10/2019 | Xu et al. | |
| 2019/0324981 A1 | 10/2019 | Counts et al. | |
| 2020/0110839 A1 | 4/2020 | Wang et al. | |
| 2020/0125482 A1 | 4/2020 | Smith et al. | |
| 2020/0133830 A1 | 4/2020 | Sharma et al. | |
| 2020/0293354 A1 | 9/2020 | Song et al. | |
| 2020/0348929 A1 * | 11/2020 | Sousa | G06F 8/36 |
| 2021/0141863 A1 | 5/2021 | Wu et al. | |
| 2021/0149668 A1 | 5/2021 | Gupta et al. | |
| 2021/0349801 A1 | 11/2021 | Rafey | |
| 2021/0357210 A1 | 11/2021 | Clement et al. | |
| 2022/0012297 A1 | 1/2022 | Basu et al. | |

FOREIGN PATENT DOCUMENTS

| | | |
|---|---|---|
| WO | WO-2007/013418 A1 | 2/2007 |
| WO | WO-2020/086773 A1 | 4/2020 |

OTHER PUBLICATIONS

Lampropoulos et al, "REACT—A Process for Improving Open-Source Software Reuse", IEEE, pp. 251-254 (Year: 2018).

Leclair et al., "A Neural Model for Generating Natural Language Summaries of Program Subroutines," Collin McMillan, Dept. of Computer Science and Engineering, University of Notre Dame Notre Dame, IN, USA, Feb. 5, 2019.

Schweik et al, Proceedings of the OSS 2011 Doctoral Consortium, Oct. 5, 2011, Salvador, Brazil, pp. 1-100, Http:/Avorks.bepress.com/charles_schweik/20 (Year: 2011).

Stanciulescu et al, "Forked and Integrated Variants in an Open-Source Firmware Project", IEEE, pp. 151-160 (Year: 2015).

Zaimi et al, ":An Empirical Study on the Reuse of Third-Party Libraries in Open-Source Software Development", ACM, pp. 1-8 (Year: 2015).

Khatri et al, "Validation of Patient Headache Care Education System (PHCES) Using a Software Reuse Reference Model", Journal of System Architecture, pp. 157-162 (Year: 2001).

Lotter et al, "Code Reuse in Stack Overflow and Popular Open Source Java Projects", IEEE, pp. 141-150 (Year: 2018).

Rothenberger et al, "Strategies for Software Reuse: A Principal Component Analysis of Reuse Practices", IEEE, pp. 825-837 (Year:2003).

Tung et al, "A Framework of Code Reuse in Open Source Software", ACM, pp. 1-6 (Year: 2014).

* cited by examiner

METHODS AND SYSTEMS FOR ASSESSING FUNCTIONAL VALIDATION OF SOFTWARE COMPONENTS COMPARING SOURCE CODE AND FEATURE DOCUMENTATION

CROSS-REFERENCE TO RELATED PATENT APPLICATION

This application claims the benefit of and priority to U.S. Provisional Patent Application No. 63/153,218 filed Feb. 24, 2021, the entire disclosure of which is incorporated by reference herein.

TECHNICAL FIELD

The present disclosure generally relates to methods and systems for evaluating software components comparing their claimed features against features extracted from their source code.

BACKGROUND

With open source technologies and cloud based public code repositories developers have access to millions of reusable code repositories. Such reusable code repositories provide access to various software components. In many cases, the code repositories present a description of the software component that identifies what the code repository or the original developers of the software component claim in regards to the functionality of the software component. However, there is no guarantee that the software component actually performs what it claims to perform. Thus, the developer has to download many software components, test and verify them before being able to use them in their applications.

The downloading, testing, and verifying of many software components may create significant delays for the developer. The developer can also be exposed to malicious software that can degrade their system and applications resulting in larger security and business risk.

U.S. Pat. No. 9,977,656 titled "Systems and methods for providing software components for developing software applications," by Raghottam Mannopantar, Raghavendra Hosabettu, and Anoop Unnikrishnan, filed on Mar. 20, 2017 and granted on May 22, 2018, discloses methods and systems for providing software components for developing software applications. In one embodiment, a method for providing software components for developing software applications is provided. The method comprises receiving user input requirements associated with the software application; determining a requirements matching score for every software component existing in an application development environment, based on a comparison between the received requirements and a requirements model, wherein the requirements model is generated based on historic user requirements and usage; determining a performance score based on a response time associated with the software components; determining weights corresponding to the requirements matching score and the performance score based on the requirements matching score; determining a combined score based on the determined scores and associated weights; selecting software components for developing the software application based on the determined combined scores; and providing the selected software components to the user.

International Patent Application Publication No. WO 2020/086773 titled "Software Test Case Maintenance," by Tamas Cesr, Jonathon Seaton, filed on Oct. 23, 2019, discloses a systems and methods for identifying elements in a software application using artificial intelligence. This publication discloses a method for identifying an element of a user interface that is a target element of a test case action, the method comprising: producing element definitions for elements of a user interface; producing element match scores for said elements by comparing each element definition to a target element definition; identifying the element having the highest element match score as the target element.

However, the prior art documents and the conventional techniques existing at the time of the present disclosure do not teach any system or method for validating a software component against their features claimed by the provider of the software component.

Therefore, there exists a need for an improved method and a system for validating a software component and verify them before being able to use them in their applications, which can reduce the delay caused by downloading, testing and verifying many software components without any compromise in security of the system.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Embodiments of the present disclosure provide systems, methods, and computer program product for assessing functional validation of software components comparing source code and feature documentation by comparing the claimed features of software components against the features extracted from their source code. To prevent the issue of having to try unverified software components the present disclosure discloses a solution that uses machine learning to extract claimed features of a software component and its actual features that are implemented in its source code. Then, for evaluating the software components, the disclosed solution compares the claimed features of software components against the features extracted from their source code to give a validated score to the developer so that the developer can easily decide on choosing the validated software.

In one embodiment, a system for assessing functional validation of software components comparing source code and feature documentation is provided. The system comprises: at least one processor that operates under control of a stored program comprising a sequence of program instructions to control one or more components, wherein the components comprising: a Web GUI portal for the a user or an external system to submit a validation request for a software component and view results; a Component Identifier that to identifies identify the software component that has been requested for validation; a Claimed Feature Extractor to anchor the claimed feature summarization across multiple assets; a Readme Extract Service to extract features claimed from readme files; a Marketing Collateral Extract Service to extract features claimed from different marketing assets; a Code Summary Extractor to anchor the code feature summarization; a Code to Text Service to convert function level code to natural language; a Code Summarization Service to summarize function level natural language to component level; a Combined Match Score generator to compare the claimed features claimed against the code features to produce a similarity validation score for the software component; and a Software Component Crawler to process different software components and to store the different software components.

In another embodiment, a method of assessing functional validation of software components comparing source code and feature documentation is provided. The method comprising steps of: providing at least one processor that operates under control of a stored program comprising a sequence of program instructions comprising: identifying a software component that has been requested for validation; anchoring the claimed feature summarization across multiple assets; extracting the features claimed from readme files; extracting the features claimed from different marketing assets; anchoring the code feature summarization; converting the function level code to natural language; summarizing the function level natural language to component level; comparing the features claimed against the code features to produce a similarity score; and processing different software components and storing the software components.

In yet another embodiment, a computer program product for assessing functional validation of software components comparing source code and feature documentation is provided. The computer program product comprises: a processor and memory storing instructions thereon, wherein the instructions when executed by the processor causes the processor to: identify a software component that has been requested for validation; anchor the claimed feature summarization across multiple assets; extract the features claimed from readme files; extract the features claimed from different marketing assets; anchor the code feature summarization; convert the function level code to natural language; summarize the function level natural language to component level; compare the features claimed against the code features to produce a similarity validation score, process different software components and storing the software components.

Details of one or more implementations of the subject matter described in this specification are set forth in the accompanying drawings and the description below. Other features, aspects, and advantages will become apparent from the description, the drawings, and the claims.

One implementation of the present disclosure is a system for automatic validation of software components comparing source code and feature documentation, the system including one or more processors and memory storing instructions that, when executed by the one or more processors, cause the one or more processors to perform operations. The operations include parsing a source code file to extract a number of functions and generate an abstract syntax tree, parsing a source code documentation file to extract a number of text sections and generating a second abstract syntax tree, parsing a source code marketing file to extract a second number of text sections and generating a third abstract syntax tree, generating a first natural language documentation for each of the number of functions using a programming language neural network model, generating a second natural language documentation for each of the first number of text sections using a text language neural network model, generating a third natural language documentation for each of the second number of text sections using a third text language neural network model, consolidating the second natural language documentation and third natural language documentation at an installation documentation level, overview documentation level, and a deployment documentation level to create a consolidated natural language documentation, summarizing multiple sentences of the first natural language documentation into a first abstract summary of the source code file, summarizing multiple sentences of the consolidated natural language documentation into a second abstract summary of the source code documentation, and comparing the first abstract summary and the second abstract summary to generate a match score. The combined match score identifies a validation metric associated with the source code and the source code documentation.

In some embodiments, the operations further include connecting to a code repository, searching the code repository for the source code file, downloading the source code file and the source code documentation file from the code repository, generating code repository meta-data; and searching public internet sources for the source code marketing file based on one or more attributes identified in the code repository meta-data.

In some embodiment, parsing the source code file to extract the number of functions and generating the first abstract syntax tree includes detecting a programming language and syntax of the source code file, parsing the source code file to extract the code snippet of the function from the source code file, and generating an abstract syntax. The abstract syntax identifies a number of function attributes.

In some embodiments, parsing the source code documentation file to extract the number of text sections and generating the second abstract syntax tree includes, detecting a file type and syntax of the source code documentation file, identifying one or more industry standard headers based on the file type and syntax, scanning the source code documentation file for one or more headers, dividing the source code documentation file into sections based on the headers, identifying semantic matches between the one or more headers and the industry standard headers, and extracting the sections associated with section headers identified as a semantic matches with the industry standard headers; and generating an abstract syntax. The abstract syntax identifies a number of text section attributes.

In some embodiments, identifying semantic matches between the one or more headers and the industry standard headers includes analyzing the headings with a natural language processing model. The industry standard headers identify at least one of installation, deployment, and data acquisition.

In some embodiments, parsing the source code marketing file to extract the second number of text sections and generating the third abstract syntax tree includes detecting a file type and syntax of the source code marketing file, identifying one or more industry standard headers based on the file type and syntax, scanning the source code documentation file for one or more headers, dividing the source code documentation file into sections based on the headers, identifying semantic matches between the one or more headers and the industry standard headers, extracting the sections associated with section headers identified as semantic matches with the industry standard headers; and generating an abstract syntax. The abstract syntax identifies a number of text section attributes.

In some embodiments, identifying semantic matches between the one or more headers and the industry standard headers includes analyzing the headers with a natural language processor model. The industry standard headers include at least one of introduction and overview.

In some embodiment, generating the first natural language documentation for each of the number of functions using the programming language neural network model includes digesting the abstract syntax tree to determine a number of function attributes and extract a number of code snippets from the number of functions, encoding the number of code snippets, preparing training data based on the function attributes and the code snippets, encoding the training data for training the programming language neural network model using a machine learning algorithm, and building the programming language neural network model using the training data.

In some embodiments comparing the first abstract summary and the second abstract summary to generate the combined match score includes generating a first numeric mapping of the first abstract summary, generating a second numeric mapping of the second abstract summary, measuring the numeric similarity between the first numeric mapping and the second numeric mapping, and generate the combined match score based on the numeric similarity.

Another implementation of the present disclosure relates to a method for automatically generating natural language documentation for source code files. The method includes parsing a source code file to extract a number of functions and generate an abstract syntax tree, parsing a source code documentation file to extract a number of text sections and generating a second abstract syntax tree, parsing a source code marketing file to extract a second number of text sections and generating a third abstract syntax tree, generating a first natural language documentation for each of the number of functions using a programming language neural network model, generating a second natural language documentation for each of the first number of text sections using a text language neural network model, generating a third natural language documentation for each of the second number of text sections using a third text language neural network model, consolidating the second natural language documentation and third natural language documentation at an installation documentation level, overview documentation level, and a deployment documentation level to create a consolidated natural language documentation, summarizing multiple sentences of the first natural language documentation into a first abstract summary of the source code file, summarizing multiple sentences of the consolidated natural language documentation into a second abstract summary of the source code documentation, and comparing the first abstract summary and the second abstract summary to generate a match score. The combined match score identifies a validation metric associated with the source code and the source code documentation.

In some embodiments, the method includes connecting to a code repository, searching the code repository for the source code file, downloading the source code file and the source code documentation file from the code repository, generating code repository meta-data, and searching public internet sources for the source code marketing file based on one or more attributes identified in the code repository meta-data.

In some embodiments, parsing the source code file to extract the number of functions and generating the first abstract syntax tree includes detecting a programming language and syntax of the source code file, parsing the source code file to extract the code snippet of the function from the source code file; and, generating an abstract syntax. The abstract syntax identifies a number of function attributes.

In some embodiments, parsing the source code documentation file to extract the number of text sections and generating the second abstract syntax tree includes detecting a file type and syntax of the source code documentation file, identifying one or more industry standard headers based on the file type and syntax, scanning the source code documentation file for one or more headers, dividing the source code documentation file into sections based on the headers, identifying semantic matches between the one or more headers and the industry standard headers, extracting the sections associated with section headers identified as a semantic matches with the industry standard headers, and generating an abstract syntax. The abstract syntax identifies a number of text section attributes.

In some embodiments identifying semantic matches between the one or more headers and the industry standard headers includes analyzing the headings with a natural language processing model. The industry standard headers identify at least one of installation, deployment, and data acquisition.

In some embodiments, parsing the source code marketing file to extract the second number of text sections and generating the third abstract syntax tree includes detecting a file type and syntax of the source code marketing file, identifying one or more industry standard headers based on the file type and syntax, scanning the source code documentation file for one or more headers, dividing the source code documentation file into sections based on the headers, identifying semantic matches between the one or more headers and the industry standard headers, extracting the sections associated with section headers identified as semantic matches with the industry standard headers, and generating an abstract syntax. The abstract syntax identifies a number of text section attributes.

In some embodiments, identifying semantic matches between the one or more headers and the industry standard headers includes analyzing the headers with a natural language processor model. The industry standard headers include at least one of introduction and overview.

In some embodiments, generating the first natural language documentation for each of the number of functions using the programming language neural network model includes digesting the abstract syntax tree to determine a number of function attributes and extract a number of code snippets from the number of functions, encoding the number of code snippets, preparing training data based on the function attributes and the code snippets, encoding the training data for training the programming language neural network model using a machine learning algorithm, and building the programming language neural network model using the training data;

In some embodiments, comparing the first abstract summary and the second abstract summary to generate the combined match score includes generating a first numeric mapping of the first abstract summary, generating a second numeric mapping of the second abstract summary, measuring the numeric similarity between the first numeric mapping and the second numeric mapping, and generate the combined match score based on the numeric similarity.

Another implementation of the present disclosure is or more non-transitory computer-readable storage media storing instructions thereon. The instructions, when executed by one or more processors, cause the one or more processors to parse a source code file to extract a number of functions and generate an abstract syntax tree, parse a source code documentation file to extract a number of text sections and generating a second abstract syntax tree, parse a source code marketing file to extract a second number of text sections and generating a third abstract syntax tree, generate a first natural language documentation for each of the number of functions using a programming language neural network model, generate a second natural language documentation for each of the first number of text sections using a text language neural network model, and generate a third natural language documentation for each of the second number of text sections using a third text language neural network model, consolidate the second natural language documentation and third natural language documentation at an installation documentation level, overview documentation level, and a deployment documentation level to create a consolidated natural language documentation, summarize multiple sentences of the first natural language documentation into a first abstract summary of the source code file, summarize multiple sentences of the consolidated natural language documentation into a second abstract summary of the source code documentation, and compare the first abstract summary and the second abstract summary to generate a match score. The combined match score identifies a validation metric associated with the source code and the source code documentation.

In some embodiments, the instructions further cause the one or more processors to generate a first numeric mapping of the first abstract summary, generate a second numeric mapping of the second abstract summary, measure the numeric similarity between the first numeric mapping and the second numeric mapping, and generate the combined match score based on the numeric similarity.

BRIEF DESCRIPTION OF THE DRAWINGS

Like reference numbers and designations in the various drawings indicate like elements.

DETAILED DESCRIPTION

To prevent issues and risks associated with downloading, testing, and verifying unverified software components, the present disclosure discloses a solution that uses machine learning to extract claimed features of a software component and the actual features that are implemented in the source code. Then, the disclosed solution compares the claimed features and the implemented features to give a validated score to the developer to easily decide on choosing the validated software.

Figure 1:
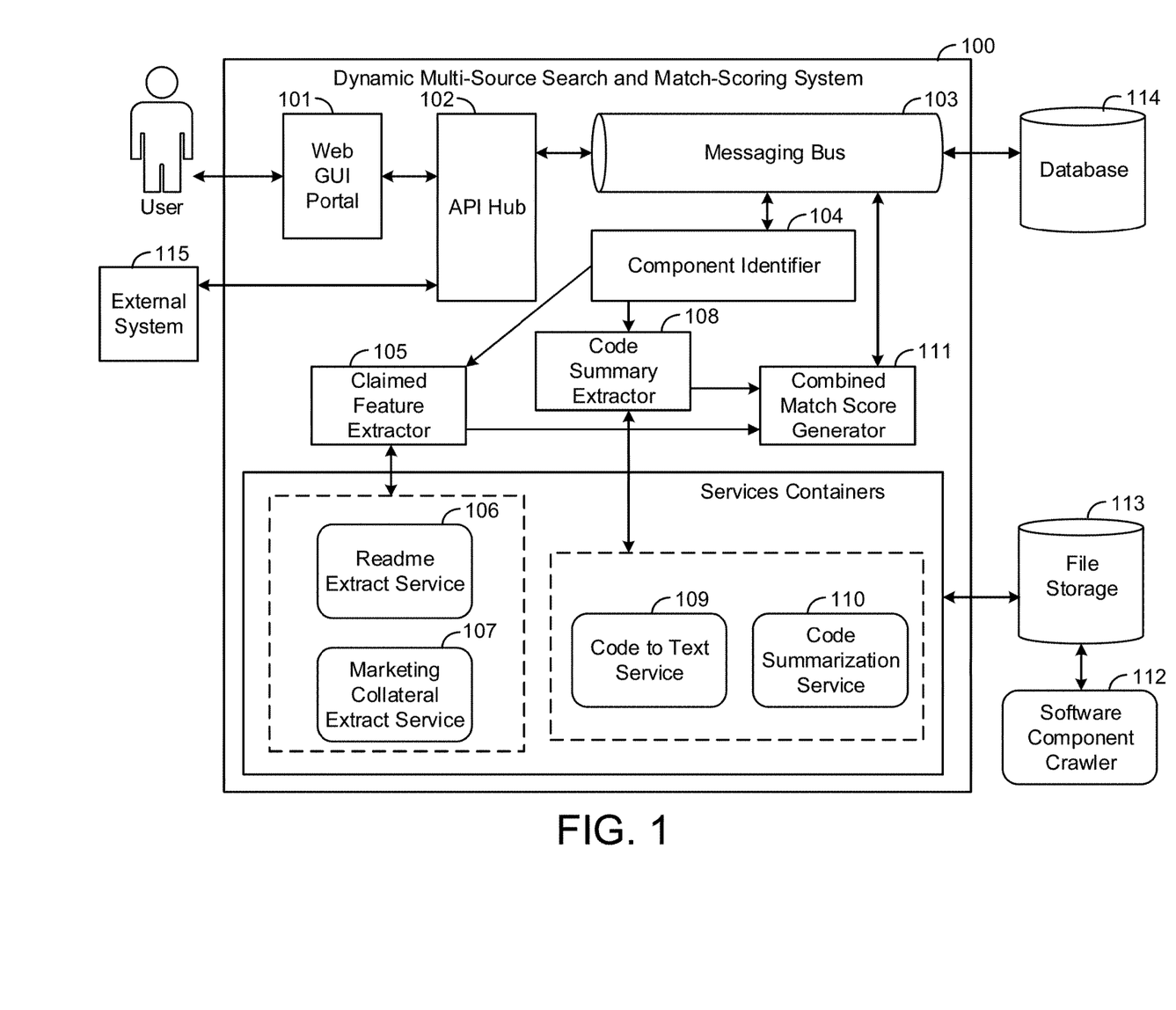
FIG. 1 shows an exemplary system architecture that performs assessing functional validation of software components comparing source code and feature documentation, according to some embodiments.

FIG. 1 shows a System 100 or a high-level architecture for functional validation of software components comparing source code and feature documentation, according to some embodiments. Briefly, and as described in further detail below, the system 100 includes a Web GUI Portal 101, API Hub 102, Messaging Bus 103, Component Identifier 104, Claimed Feature Extractor 105, Readme Extract Service 106, Marketing Collateral Extract Service 107, Code Summary Extractor 108, Code to Text Service 109, Code Summarization Service 110, Combined Match Score generator 111, Software Component Crawler 112, File Storage 113 and Database 114, which are a unique set of components to perform the task of functional validation of software components comparing source code and feature documentation.

As shown in FIG. 1, according to some embodiments, the System 100 includes the Web GUI Portal 101, which includes a User Interface form for a user to interface with the System 100 for submitting different requests and viewing their status. It allows the user to submit requests for validating software components and viewing the generated results. For submitting a new request, the user is presented with a form to provide the software component that they would like to validate. In a publicly available software component, the user may only need to provide the name of the software component. If the software component is private (e.g. requiring a license, code, etc.), the user may provide a software component code as well as various features against which the code is to be validated. After entering these details, the System 100 assesses the provided information and presents options to submit the request. After System 100 completes processing the validation, the user can access the results from a status screen via the Web GUI Portal 101. Alternatively, where automation is required, the Web GUI Portal 101 can also interact with an External System 115 via the API Hub 102 to access the same information that the user would have provided.

The submitted request is transmitted from the Web GUI Portal 101 to the API hub 102 which acts as a gateway for accepting and transmitting all web service requests from the Web GUI Portal 101. The API Hub 102 hosts the web services for taking the requests and creating request messages to be put into the Messaging Bus 103. The messaging bus 103 provides for event driven architecture thereby enabling long running processes to be decoupled from requesting system's calls. This decoupling may help the system to service the request and notify the user once the entire process of validating the software component is completed. The System 100 may further include job listeners configured to listen to the messages in the messaging bus 103.

In some embodiments, the Component Identifier 104 identifies the software component that has been requested for validation and creates a list of assets to be cross-verified. For a publicly available component, the Component Identifier 104 identifies a source of the software component code by scanning public repositories, associated readme files, and marketing collateral locations from repositories on a provider website associated with the software component. For private components, the user or External System 115 may upload the files or share credentials for a private repository and the Component Identifier 104 assembles the code location and the document locations accordingly.

In some embodiments, the Claimed Feature Extractor 105 calls Readme Extract Service 106 and Marketing Collateral Extract Service 107 to create a natural language summary of software component features that are claimed by the software component provider. After receiving the results from the Services 106 and 107, the Claimed Feature Extractor 106 applies machine learning techniques focused on topic modeling to arrange similar sections, and further uses a machine learning-based summarizer to summarize the content in each topic to create the list of claimed features across all the readme and marketing assets produced by the Readme Extract Service 106 and the Marketing Collateral Extract Service 107.

In some embodiments, the Readme Extract Service 106 uses machine learning techniques to extract content from different sections such as but not limited to overview, features, and benefits from the readme files.

In some embodiments, the Marketing Collateral Extract Service 107 uses machine learning techniques to extract content from sections such as features, benefits from multiple marketing collateral that might be in multiple formats such as but not limited to word, pdf, web page.

In some embodiment, the Code Summary Extractor 108 calls the Code to Text Service 109 to get a detailed text representation of the software component code and passes it to the Code Summarization Service 110 to get a natural language summary of the software component code.

In some embodiments, the Code to Text Service 109 uses machine learning techniques to convert programming language to natural language. The Code to Text Service 109 can process a variety of programming languages including, but not limited to, Java, JavaScript, C#, Ruby, Python, Typescript, PHP, Go. It also generates natural language across popular languages including, but not limited to, English, German, and French. The Code to Text Service 109 produces text for each function available in the programming language source code. Where source code is not available, it uses the API interface definitions to document the inputs and outputs of the software component.

In some embodiments, the Code Summarization Service 110 uses machine learning techniques to summarize the natural language representation of different code snippets into a single natural language summary. The Code Summarization Service 110 processes the summary iteratively based on the program structure such as number of files, classes, functions and other sub routines. The Code Summarization Service 110 creates a brief summary representing the software component functionality.

In some embodiments, the Combined Match Score Generator 111 uses machine learning techniques to compare the natural language summary of the readme and marketing collateral data provided by the Claimed Features Extractor 105 against the natural language summary of the code assets provided by the Code Summarization Service 110. The Combined Match Score Generator 111 provides a numerical similarity score between 0 and 1 with 0 being fully dissimilar and 1 being identical. This validation is passed back to the user or the External System 115.

In some embodiments, the Software Component Crawler 112 processes different software component details that are available in public sources such as public code repositories including, but not limiting to, GitHub, GitLab, BitBucket, and SourceForge; Cloud and API providers including, but not limiting to, Microsoft Azure, Amazon Web Services, Google Compute Platform, RapidAPI; software package managers including, but not limiting to, NPM and PyPi; and public websites including, but not limiting to, the product details page of the software component provider and Wikipedia. The Software Component Crawler 112 then stores the details into the File Storage 113 as code files, API definition files, repository name files, readme files, and marketing collateral files along with a unique identifier for the software component.

In some embodiments, the File Storage 113 is used to store document type data, source code files, document files, readme files, installation guide files, marketing collateral files, user guide files, and neural network models.

In some embodiments, the Database 114 is Relational Database Management System (RDBMS e.g., MySQL) to store all meta-data pertaining to the requests received from the user, External System 115, Messaging Bus 103, API Hub 102 and from other system components described above. The meta-data includes details of every request to identify who submitted it and requested details to track the progress as the System 100 processes the request through its different tasks. The status of each execution step in whole process is stored in the Database 114 to track and notify the system on completion.

Figure 2:
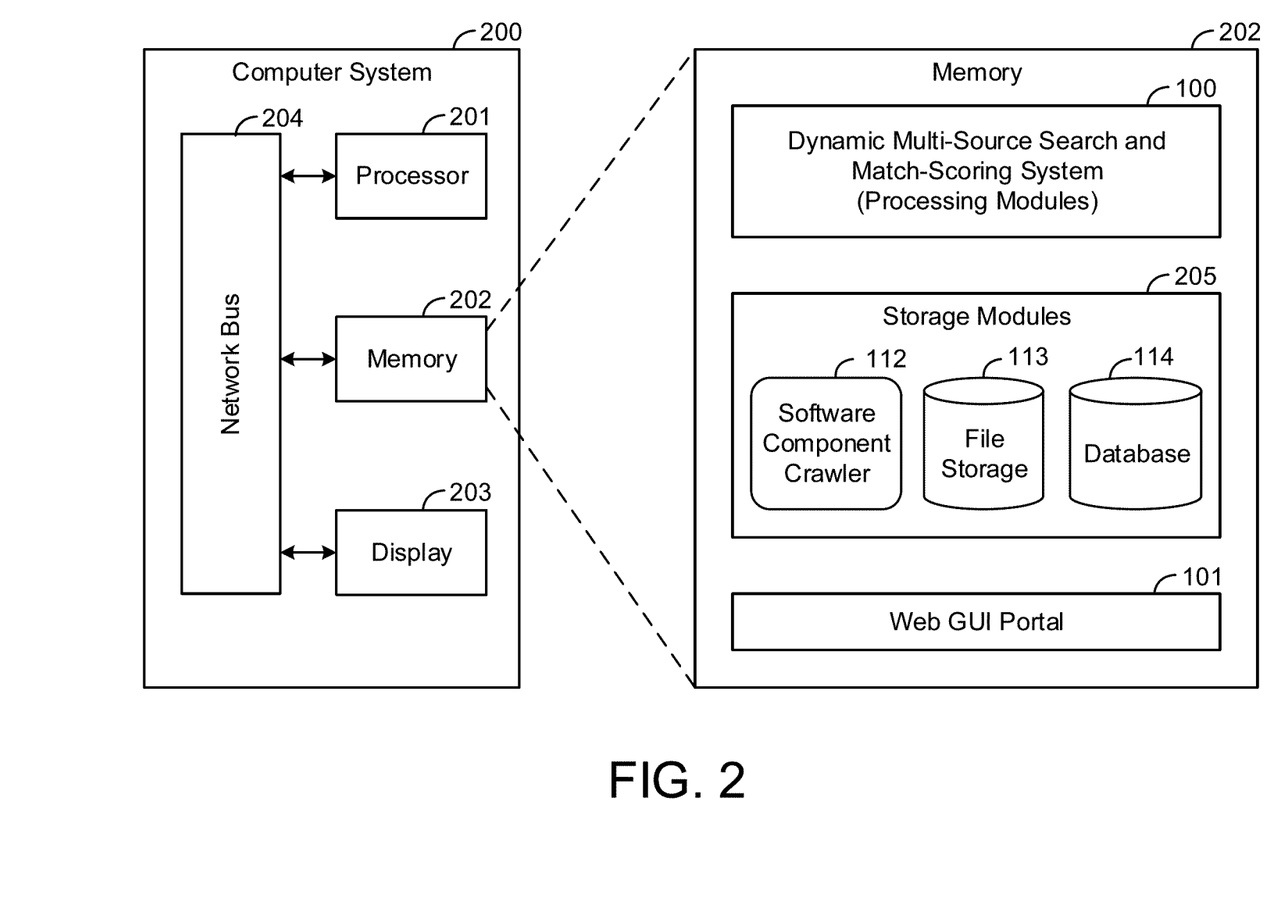
FIG. 2 shows an example computer system implementation for assessing functional validation of software components comparing source code and feature documentation, according to some embodiments.

FIG. 2 shows a block view of a Computer System 200 which can be used to execute some or all of the functional features of system 100 including performing functional validation of software components comparing source code and feature documentation, according to some embodiments. Computer System 200 may be implemented as an embodiment of System 100. The System 200 may include a Processor 201, Memory 202, Display 203, Network Bus 204, and other input/output like a mic, speaker, wireless card etc. The System 100 including the Software Component Crawler 112, File Storage 113, and Database 114 are stored in the Memory 202 which provides the necessary machine instructions to the Processor 201 to perform the executions for functional validation of software components comparing source code and feature documentation. In some embodiments, the Processor 201 controls the overall operation of the system and managing the communication between the components through the Network Bus 204. The Memory 202 holds the functional validation of software components comparing source code and feature documentation system code, data and instructions of the System 100 and may be of different types of the non-volatile memory and volatile memory.

Figure 3:
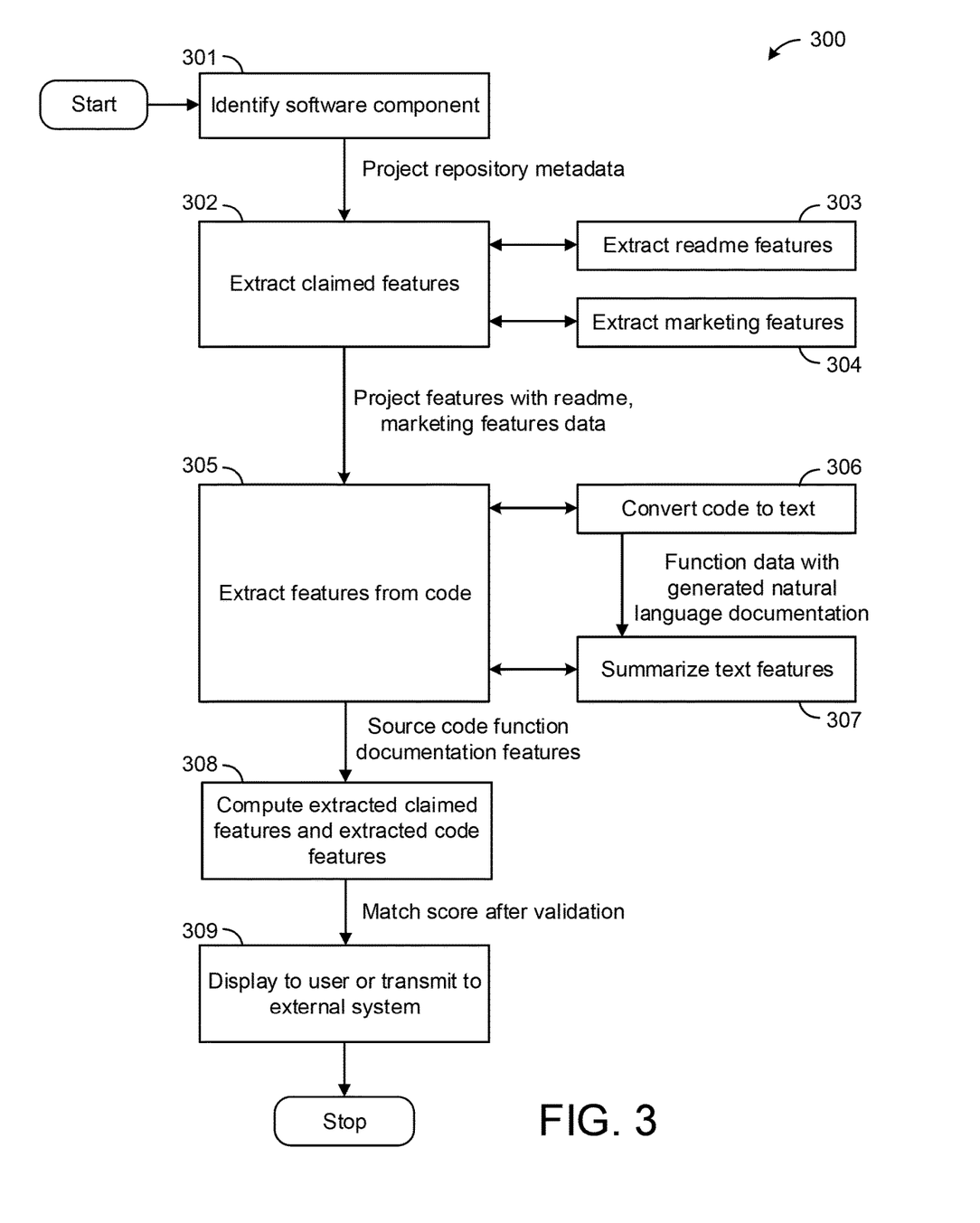
FIG. 3 shows the overall process flow of assessing functional validation of software components comparing source code and feature documentation, according to some embodiments.

FIG. 3 shows a process 300 illustrating the end-to-end process for functional validation of software components comparing source code and feature documentation, according to some embodiments. Process 300 can be performed by System 100. In step 301, the user entered software component details are processed to uniquely identify a software component and its related assets such as source code, readme data, and marketing collateral. In other words, step 301 may produce repository metadata. In step 302, the claimed features are summarized after calling the respective services. Accordingly, step 302 may include subsidiary steps 303 and 304. In step 303, the features of the software components documented in the readme files are extracted and summarized. In the step 304, the features of the software component claimed in different marketing collateral are extracted and summarized. Following step 302 and, in some embodiments, steps 303 and 304, in step 305 a programming language is anchored to natural language processing and services are called to convert function level code to natural language and ultimately produce a software component level summary. Accordingly, step 305 may include subsidiary steps 306 and 307. In step 306, programming languages across multiple technologies are converted to natural language across multiple files, classes and functions. In other words, step 306 may produce functional data with natural language documentation. In step 307, the natural language representation of function level code is summarized to a single component level summary. Thus, step 305 may ultimately produce source code documentation features. Following step 305 and, in some embodiments, steps 306 and 307, in step 308 the features from the documents and the features from the code assets are compared and a similarity score is generated and transmitted to the user or a calling system in step 309. In other words, step 308 may produce a match score that is displayed in step 309.

Figure 4:
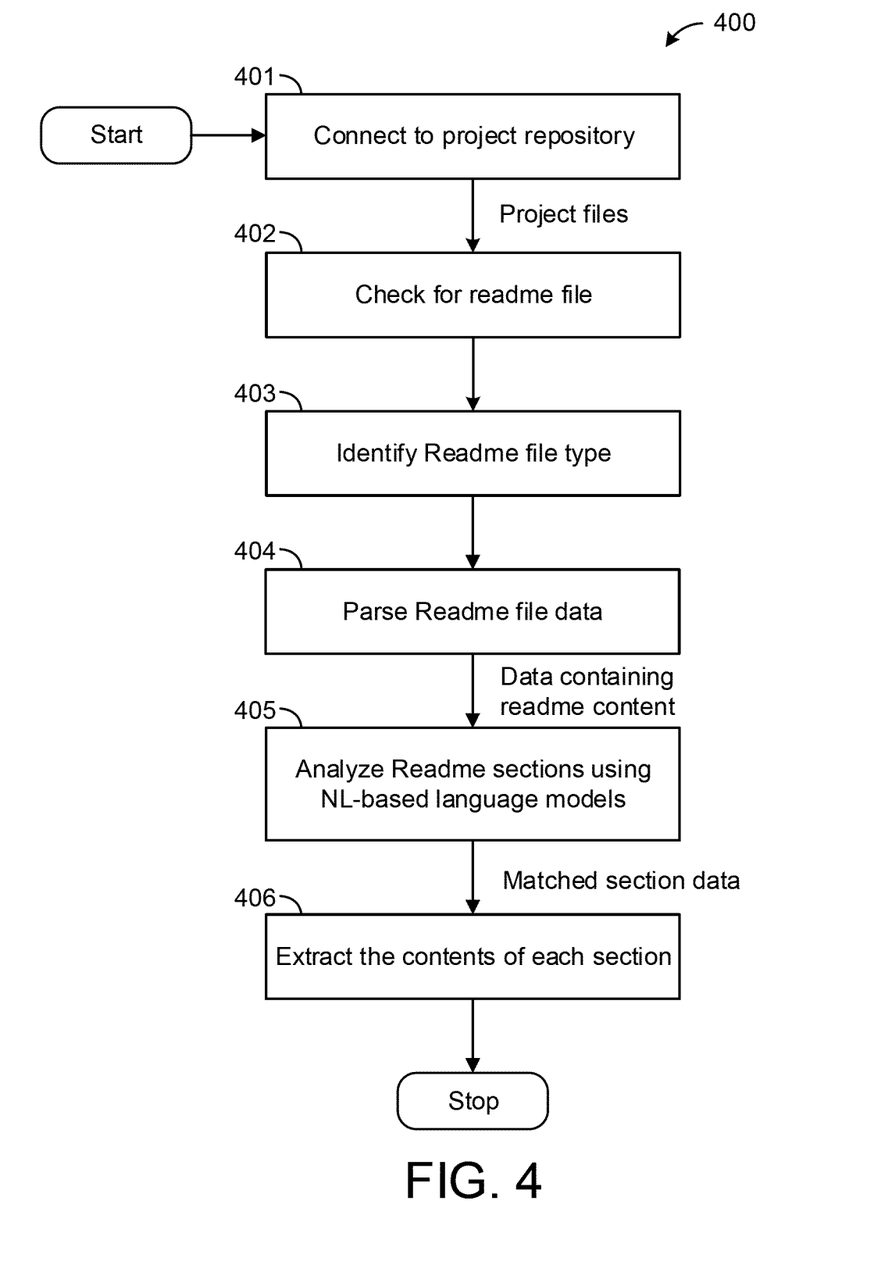
FIG. 4 is a flow diagram illustrating the steps involved in Readme Extract Service, according to some embodiments.

FIG. 4 shows a process 400 illustrating the steps involved for the operation of the Readme Extract Service 106 introduced above in regards to FIG. 1, according to some embodiments. Process 400 can be performed by System 100, in particular the Readme Extract Service 106 in some embodiments. The Claimed Feature Extractor 105 may interact with the Readme Extract Service 106 to perform some or all of the steps of the process 400 in some embodiments. In step 401, the Readme Extract Service 106 receives the project repository metadata from the Claimed Feature Extractor 105 and connects with a project repository. Step 401 may produce project files. The project repository is checked for the presence of a readme file in any format in step 402. If a presence of readme file is identified in the step 402, the readme file is subjected to further checks for identifying the file type. The file type of the readme file can include Markdown, text files etc. The file extension of the readme file is analyzed to identify the file type in step 403. Once the file type is identified, a suitable parser based on the file type is used to parse the data in the readme file and identify different sections in the file in step 404. In other words, step 404 may produce data containing readme content. The parsed contents from step 404 are then processed in step 405, wherein the individual section headings of the parsed readme files are semantically analyzed with natural language processing (NLP) models to check for a semantic matching of the industry standard readme documentation sections like installation, deployment, data acquisition, etc. Step 405 may produce matched section data. Once the analysis process is complete in step 405, the identified section headers and their respective section data are extracted in step 406. Finally, the extracted section contents are sent to the Claimed Feature Extractor 105 introduced above in regards to FIG. 1.

Figure 5:
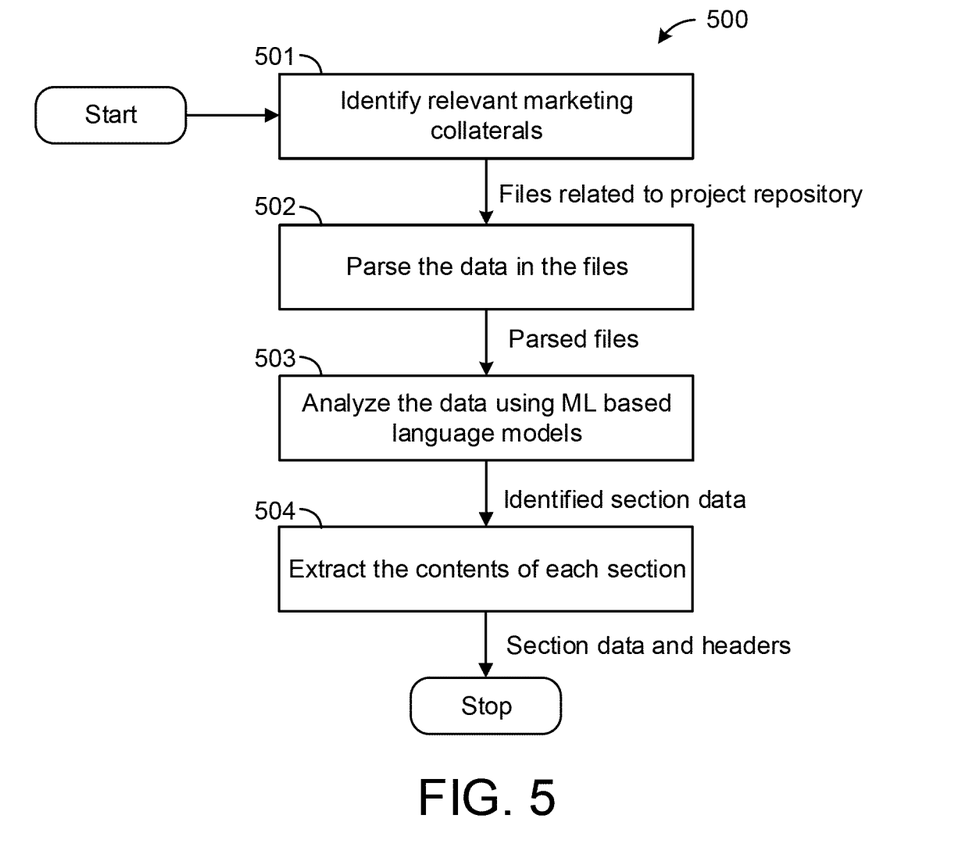
FIG. 5 is a flow diagram illustrating the steps involved in Marketing Collateral Extract Service, according to some embodiments.

FIG. 5 shows a process 500 illustrating the steps involved for the operation of Marketing Collateral Extract Service 107 introduced above in regards to FIG. 1, according to some embodiments. In some embodiments, the process 500 can be performed by the System 100. In some embodiments, the Claimed Feature Extractor 105 interacts with the Marketing Collateral Extract Service 107, similarly introduced above, to perform some or all of the steps of the process 500. In step 501, the Marketing Collateral Extract Service 107 receives project repository metadata is received from the Claimed Feature Extractor 105 and the Marketing Collateral Extract Service 107 identifies the presence of suitable marketing collaterals related to the project repository in the File Storage 113 introduced above in regards to FIG. 1. If a suitable marketing collateral related to the project repository is not present in the File Storage 113, the Software Component Crawler 112 similarly introduced above is triggered to fetch marketing collaterals from various sources including, but not limited to, blogs, tutorial pages, etc. The data is then stored in the File Storage 113 and sent to the Marketing Collateral Extract Service 107. Once the marketing collateral files are identified by the Marketing Collateral Extract Service 107, the files are parsed in the step 502 using different parsers in accordance with the file type of the marketing collateral files. The possible file types may include word documents, PDFs, HTML webpages etc. The parsed contents from step 502 are then processed in step 503, where the individual sections and section headings of the parsed files are semantically analyzed with natural language processing (NLP) models to check for a semantic matching of the possible industry standard section norms (e.g., installation, overview etc.). Once the analysis process is complete in step 503, the identified section headers and their respective section data are extracted in step 504. The extracted section contents are sent by the Marketing Collateral Extract Service 107 to the Claimed Feature Extractor 105.

In some embodiments, the contents of the Readme Extract Service 106 and Marketing Collateral Extract Service 107 are received by the Claimed Feature Extractor 105. The Claimed Feature Extractor 105 consolidates the section data from both the services 105 and 106 by making use of machine learning techniques of topic modelling which might include using techniques such as latent semantic analysis (LSA), non-negative matrix factorization (NMF), pachinko allocation model (PAM), etc. The section data are consolidated and allocated to specific section headers. These section data are then summarized using a machine learning/neural network based summarizer to generate a summary of the data in the marketing collaterals.

Figure 6:
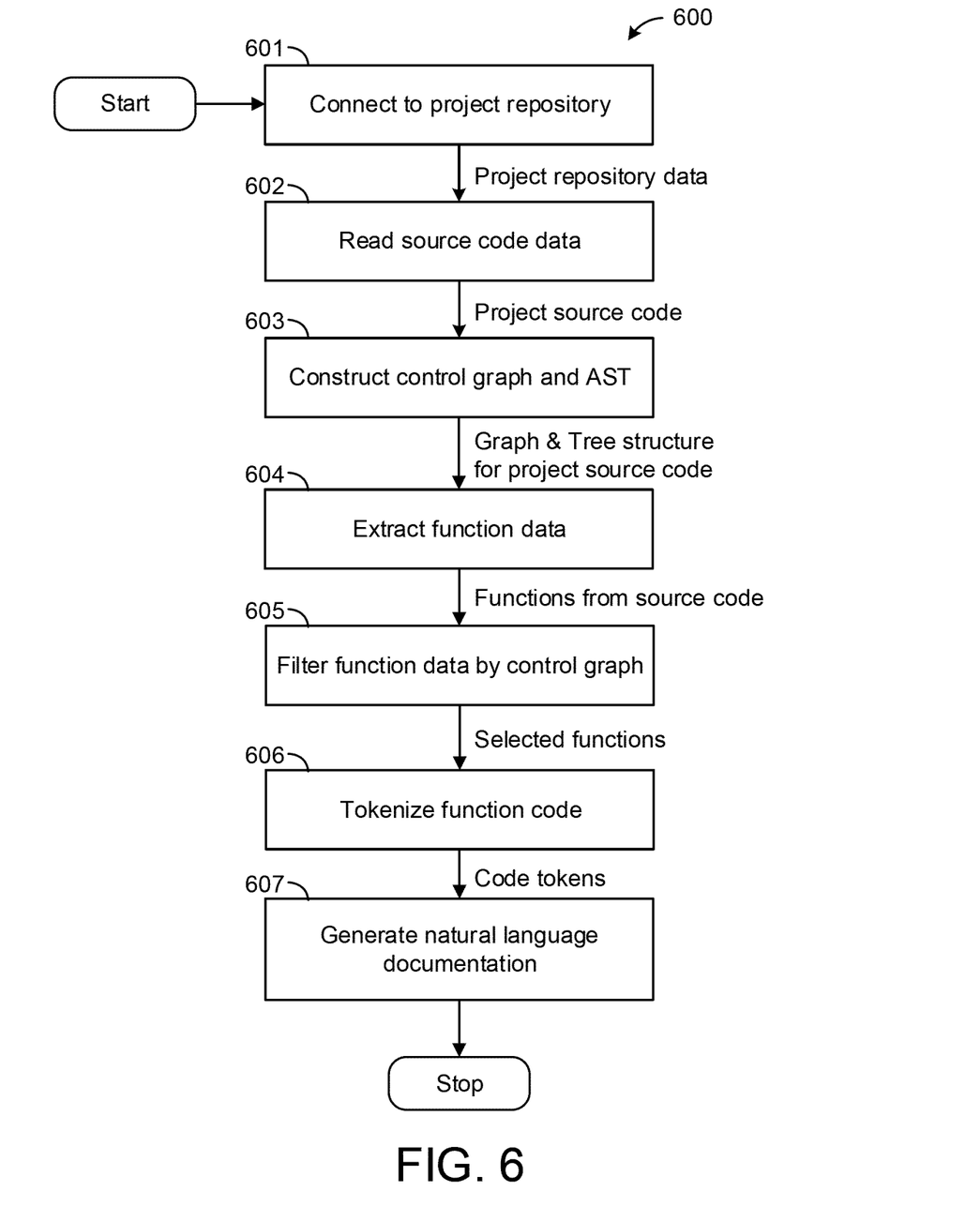
FIG. 6 is a flow diagram illustrating the steps involved in Code to Text service, according to some embodiments.

FIG. 6 shows a process 600 illustrating the steps involved in the operation of the Code to Text service 109 introduced above in regards to FIG. 1, according to some embodiments. Some or all of the steps of the process 600 can be performed by the system 100. The Code Summary Extractor 108 interacts with the Code to Text Service 109, similarly introduced above, to perform some or all steps of the process 600. In step 601 the Code to Text Service 109 receives project repository metadata from Code Summary Extractor 108 and connects with the project repository. The project repository source code is read and downloaded in the step 602. The project repository source code from step 602 is then converted to a control graph (e.g., an abstract syntax tree) in the step 603 to identify the control flow in the source code of the project repository. Functions of the source code from step 603 are processed in step 604, where the project files are parsed to identify function data by analyzing the attributes in the abstract syntax tree generated in step 603, thereby creating function attributes like function code, function documentation, function name, class name, package name etc. The extracted functions are further filtered by a control graph in step 605 by checking for specific criteria including lines of code of the function, order of methods in the generated control graph, etc. The function source code of the filtered functions from step 605 are then converted into code tokens using machine learning techniques in step 606. Step 607 involves the generation of natural language text equivalent to each code token from step 606. Step 607 involves making use of a neural network model which accepts the function data with function data attributes from the step 606 and generates a natural language documentation for each function data by consuming the code tokens and other function attributes. The generated natural language documentation are sent to the Code Summary Extractor Service 108. A representative sample of result of the natural language documentation which can be generated by the Code to Text Service 109 in step 607 is shown below:

```
{
  "function_data":[
    {
      "code":"public double interestEarned( ) {\n double amount = sumTransactions( );\n switch(accountType){\n case SAVINGS:\n if (amount <= 1000)\n return amount * 0.001;\n else\n return 1 + (amount-1000) * 0.002;\n case MAXI_SAVINGS:\n if (amount <= 1000)\n return amount * 0.02;\n if (amount <= 2000)\n return 20 + (amount-1000) * 0.05;\n return 70 + (amount-2000) * 0.1;\n default:\n return amount * 0.001;}\n }",
      "generated_documentation":"Calculate the Interest earned"
    }
  ]
}
```

Figure 7:
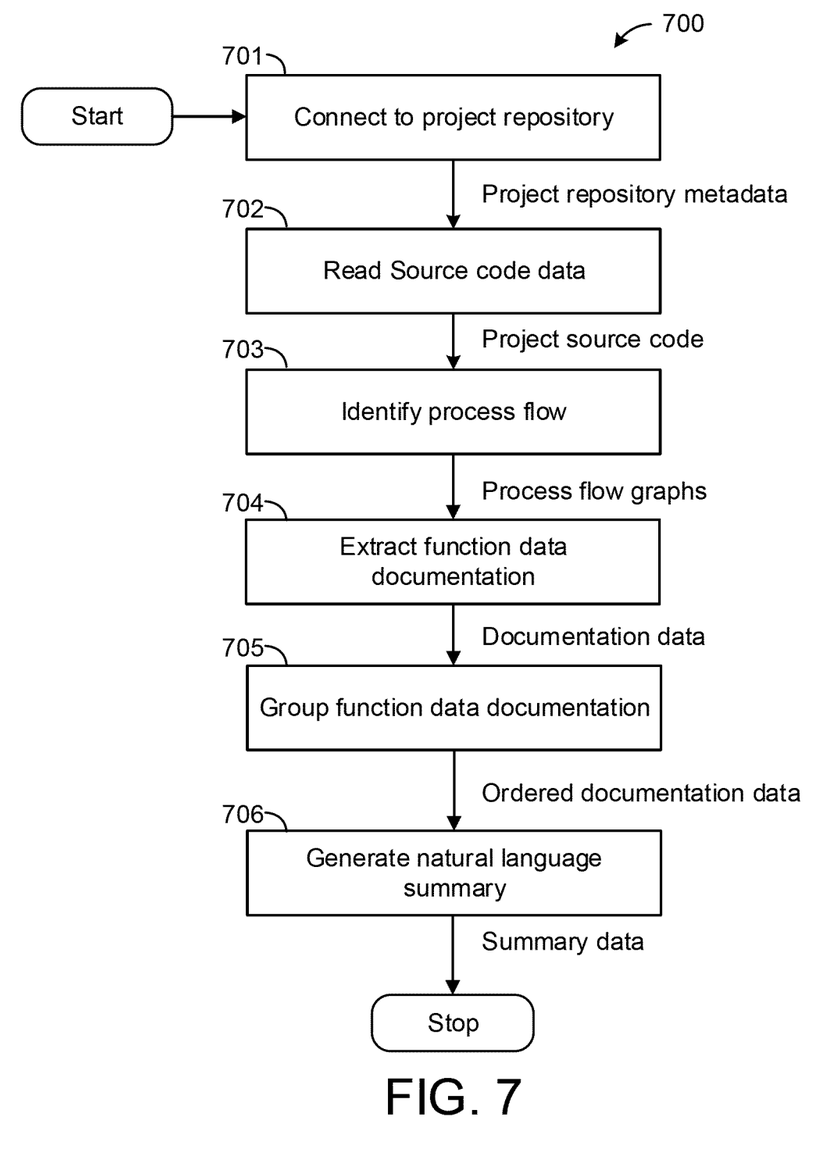
FIG. 7 is a flow diagram illustrating the steps involved in Code Summarization Service, according to some embodiments.

FIG. 7 shows a process 700 illustrating the steps involved in the operation of Code Summarization Service 110 introduced above in regards to FIG. 1, which receives the generated natural language documentation along with function data in the step 607, according to some embodiments. In some embodiments, some or all of the steps of the process 700 can be performed by the system 100. The Code Summary Extractor 108, similarly introduced above, interacts with the Code Summarization Service 110 by receiving the summary generated from the Code Summarization Service 110. In step 701 the Code Summarization Service 110 receives the project repository metadata from the function data with generated documentation and connects with the project repository. The project repository source code is read and downloaded in the step 702. The project repository source code produced in step 702 is analyzed to identify process flow of the project repository source code in step 703. The process flow may aid in finding the flow of a functional process in a source code containing many functions, methods, classes and packages. Once the process flow is identified, the function data with generated documentation is parsed and processed in step 704 to extract the natural language generated documentation. The extracted documentation from step 704 are then grouped together in step 705 by the order of process flow produced in step 703 by grouping the document data on different process attributes like class, package, method etc. The grouped documentation data are consolidated and processed by using natural language processing and machine learning techniques by making use of neural network model to generate a summary of the documentation in step 706. The generated natural language summary is then sent to the Code Summary Extractor Service 108.

Figure 8:
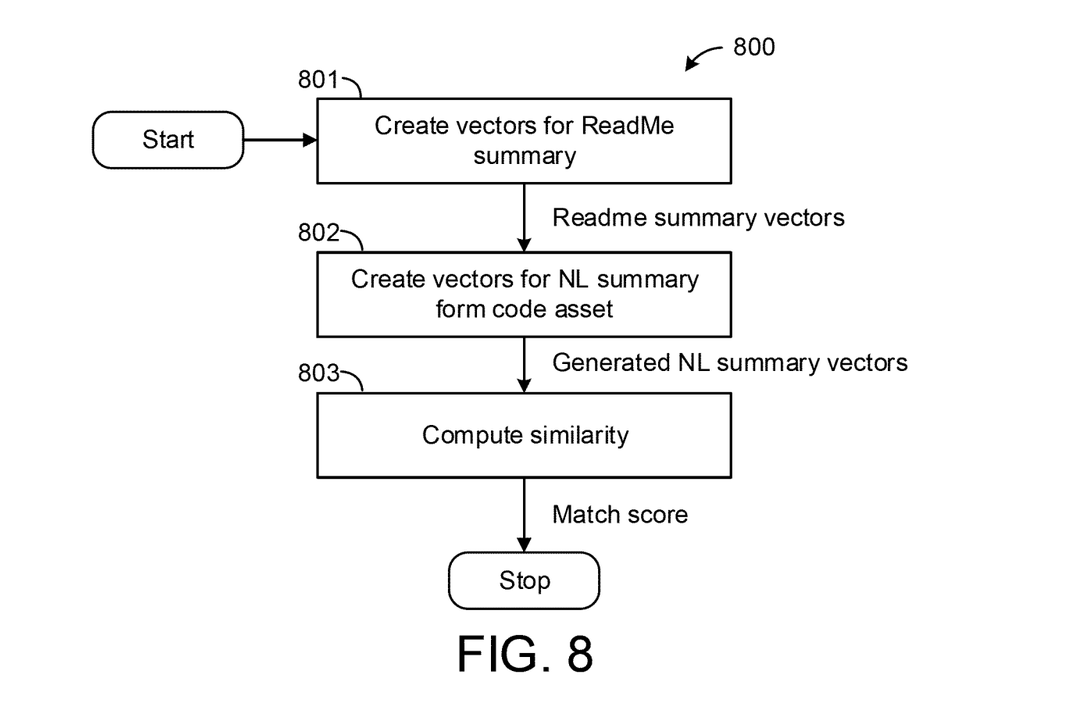
FIG. 8 is a flow diagram illustrating the steps involved in a Combined Match Score generator, according to some embodiments.

FIG. 8 shows a process 800 illustrating the steps involved in the operation of the Combined Match Score Generator 111, introduced above in regards to FIG. 1. In some embodiments, some or all of the steps of the process 800 can be performed by the system 100. The Combined Match Score Generator 111 may receive the natural language summary from readme assets from the Claimed Feature Extractor 105 service and also the generated natural language documentation summary from the code assets from the Code Summary Extractor 108 service, each similarly introduced above. The natural language summary from readme assets received from the Claimed Feature Extractor 105 are converted to numerical embeddings or vectors in step 801. The embeddings are generated through machine learning language models. The generated natural language documentation summary from the code assets from the Code Summary Extractor 108 are converted to numerical embeddings or vectors in step 802. Both the embeddings are processed in step 803, where the similarity between both the embeddings are measured by using different statistical and language similarity measures like cosine similarity, Jaccard distances etc. The result of step 803 is a combined similarity or match score generated in the range between 0 and 1, with 1 being very similar and 0 being very dissimilar. An example representation of the embedding from step 801, 802 is shown below:

Example Readme Summary Embedding from Step 801
array([0.3005656, 0.3239392, −0.8714988, . . . , −0.01961522, 1.0207764, −0.542432], dtype=float32)

Example NL Summary Form Code Asset Embedding from Step 802
array([0.7163520, 0.3112348, −0.0873288, . . . , −0.0122876, −2.8226122, 0.7541928], dtype=float32)

As multiple embodiments of the present disclosure have been elaborated above, it should be construed that they have been described by way of example alone, and not by way of limitation. Hence, the scope of the present disclosure should not be limited by any of the exemplary embodiments. Additionally, the disclosure is defined above in terms of multiple exemplary embodiments and applications. It should be understood that the several features and the functionality explained in one or more of the distinct embodiments are not limited in their applicability to the specific embodiment with which they are explained, but instead can be functional, by itself or in a defined combination, to one or more of the other embodiments of the disclosure, whether or not such embodiments are explained and whether or not such aspects are presented as being a part of a described embodiment.

What is claimed is:

1. A system for automatic validation of software components comparing source code and feature documentation, the system comprising:
   one or more processors and memory storing instructions that, when executed by the one or more processors, cause the one or more processors to perform operations comprising:
      parsing a source code file to extract a plurality of functions and generate a first abstract syntax tree;
      parsing a source code documentation file to extract a first plurality of text sections and generating a second abstract syntax tree;
      parsing a source code marketing file to extract a second plurality of text sections and generating a third abstract syntax tree;
      generating a first natural language documentation for each of the plurality of functions using a programming language neural network model;
      generating a second natural language documentation for each of the first plurality of text sections using a text language neural network model;

generating a third natural language documentation for each of the second plurality of text sections using a third text language neural network model;
consolidating the second natural language documentation and the third natural language documentation at an installation documentation level, overview documentation level, and a deployment documentation level to create a consolidated natural language documentation;
summarizing multiple sentences of the first natural language documentation into a first abstract summary of the source code file;
summarizing multiple sentences of the consolidated natural language documentation into a second abstract summary of the source code documentation file; and
comparing the first abstract summary and the second abstract summary to generate a combined match score, wherein the combined match score identifies a validation metric associated with the source code file and the source code documentation file.

2. The system of claim 1, the operations further comprising:
connecting to a code repository;
searching the code repository for the source code file;
downloading the source code file and the source code documentation file from the code repository;
generating code repository metadata; and
searching public internet sources for the source code marketing file based on one or more attributes identified in the code repository metadata.

3. The system of claim 1, wherein parsing the source code file to extract the plurality of functions and generating the first abstract syntax tree comprises:
detecting a programming language and syntax of the source code file;
parsing the source code file to extract a code snippet of the plurality of functions from the source code file; and
generating an abstract syntax, wherein the abstract syntax identifies a plurality of function attributes.

4. The system of claim 1, wherein parsing the source code documentation file to extract the first plurality of text sections and generating the second abstract syntax tree comprises:
detecting a file type and syntax of the source code documentation file;
identifying one or more industry standard headers based on the file type and syntax;
scanning the source code documentation file for one or more headers;
dividing the source code documentation file into sections based on the one or more headers;
identifying semantic matches between the one or more headers and the industry standard headers; and
extracting the sections associated with section headers identified as a semantic matches with the industry standard headers; and
generating an abstract syntax, wherein the abstract syntax identifies a plurality of text section attributes.

5. The system of claim 4, wherein identifying the semantic matches between the one or more headers and the industry standard headers comprises analyzing the one or more headers with a natural language processing model, wherein the industry standard headers identify at least one of installation, deployment, and data acquisition.

6. The system of claim 1, wherein parsing the source code marketing file to extract the second plurality of text sections and generating the third abstract syntax tree comprises:
detecting a file type and syntax of the source code marketing file;
identifying one or more industry standard headers based on the file type and syntax;
scanning the source code documentation file for one or more headers;
dividing the source code documentation file into sections based on the one or more headers;
identifying semantic matches between the one or more headers and the industry standard headers;
extracting the sections associated with section headers identified as semantic matches with the industry standard headers; and
generating an abstract syntax, wherein the abstract syntax identifies a plurality of text section attributes.

7. The system of claim 6, wherein identifying the semantic matches between the one or more headers and the industry standard headers comprises analyzing the one or more headers with a natural language processor model, wherein the industry standard headers include at least one of introduction and overview.

8. The system of claim 1, wherein generating the first natural language documentation for each of the plurality of functions using the programming language neural network model comprises:
digesting the first abstract syntax tree to determine a plurality of function attributes and extract a plurality of code snippets from the plurality of functions;
encoding the plurality of code snippets;
preparing training data based on the plurality of function attributes and the plurality of code snippets;
encoding the training data for training the programming language neural network model using a machine learning algorithm; and
building the programming language neural network model using the training data.

9. The system of claim 1, wherein comparing the first abstract summary and the second abstract summary to generate the combined match score comprises
generating a first numeric mapping of the first abstract summary
generating a second numeric mapping of the second abstract summary;
measuring a numeric similarity between the first numeric mapping and the second numeric mapping;
generating the combined match score based on the numeric similarity.

10. A method for automatically generating natural language documentation for source code files, the method comprising:
parsing a source code file to extract a plurality of functions and generate a first abstract syntax tree;
parsing a source code documentation file to extract a first plurality of text sections and generating a second abstract syntax tree;
parsing a source code marketing file to extract a second plurality of text sections and generating a third abstract syntax tree;
generating a first natural language documentation for each of the plurality of functions using a programming language neural network model;
generating a second natural language documentation for each of the first plurality of text sections using a text language neural network model;

generating a third natural language documentation for each of the second plurality of text sections using a third text language neural network model;
consolidating the second natural language documentation and the third natural language documentation at an installation documentation level, overview documentation level, and a deployment documentation level to create a consolidated natural language documentation;
summarizing multiple sentences of the first natural language documentation into a first abstract summary of the source code file;
summarizing multiple sentences of the consolidated natural language documentation into a second abstract summary of the source code documentation file; and
comparing the first abstract summary and the second abstract summary to generate a combined match score, wherein the combined match score identifies a validation metric associated with the source code file and the source code documentation file.

11. The method of claim 10, the method further comprising:
connecting to a code repository;
searching the code repository for the source code file;
downloading the source code file and the source code documentation file from the code repository;
generating code repository metadata; and
searching public internet sources for the source code marketing file based on one or more attributes identified in the code repository metadata.

12. The method of claim 10, wherein parsing the source code file to extract the plurality of functions and generating the first abstract syntax tree comprises:
detecting a programming language and syntax of the source code file;
parsing the source code file to extract a code snippet of the plurality of functions from the source code file; and
generating an abstract syntax, wherein the abstract syntax identifies a plurality of function attributes.

13. The method of claim 10, wherein parsing the source code documentation file to extract the first plurality of text sections and generating the second abstract syntax tree comprises:
detecting a file type and syntax of the source code documentation file;
identifying one or more industry standard headers based on the file type and syntax;
scanning the source code documentation file for one or more headers;
dividing the source code documentation file into sections based on the one or more headers;
identifying semantic matches between the one or more headers and the industry standard headers; and
extracting the sections associated with section headers identified as a semantic matches with the industry standard headers; and
generating an abstract syntax, wherein the abstract syntax identifies a plurality of text section attributes.

14. The method of claim 13, wherein identifying the semantic matches between the one or more headers and the industry standard headers comprises analyzing the one or more headers with a natural language processing model, wherein the industry standard headers identify at least one of installation, deployment, and data acquisition.

15. The method of claim 10, wherein parsing the source code marketing file to extract the second plurality of text sections and generating the third abstract syntax tree comprises:
detecting a file type and syntax of the source code marketing file;
identifying one or more industry standard headers based on the file type and syntax;
scanning the source code documentation file for one or more headers;
dividing the source code documentation file into sections based on the one or more headers;
identifying semantic matches between the one or more headers and the industry standard headers;
extracting the sections associated with section headers identified as semantic matches with the industry standard headers; and
generating an abstract syntax, wherein the abstract syntax identifies a plurality of text section attributes.

16. The method of claim 15, wherein identifying the semantic matches between the one or more headers and the industry standard headers comprises analyzing the one or more headers with a natural language processor model, wherein the industry standard headers include at least one of introduction and overview.

17. The method of claim 16, wherein generating the first natural language documentation for each of the plurality of functions using the programming language neural network model comprises:
digesting the first abstract syntax tree to determine a plurality of function attributes and extract a plurality of code snippets from the plurality of functions;
encoding the plurality of code snippets;
preparing training data based on the plurality of function attributes and the plurality of code snippets;
encoding the training data for training the programming language neural network model using a machine learning algorithm; and
building the programming language neural network model using the training data.

18. The method of claim 10, wherein comparing the first abstract summary and the second abstract summary to generate the combined match score comprises:
generating a first numeric mapping of the first abstract summary
generating a second numeric mapping of the second abstract summary;
measuring a numeric similarity between the first numeric mapping and the second numeric mapping; and
generating the combined match score based on the numeric similarity.

19. One or more non-transitory computer-readable storage media storing instructions thereon, wherein the instructions when executed by one or more processors, cause the one or more processors to:
parse a source code file to extract a plurality of functions and generate a first abstract syntax tree;
parse a source code documentation file to extract a first plurality of text sections and generating a second abstract syntax tree;
parse a source code marketing file to extract a second plurality of text sections and generating a third abstract syntax tree;
generate a first natural language documentation for each of the plurality of functions using a programming language neural network model;
generate a second natural language documentation for each of the first plurality of text sections using a text language neural network model;

generate a third natural language documentation for each of the second plurality of text sections using a third text language neural network model;

consolidate the second natural language documentation and the third natural language documentation at an installation documentation level, overview documentation level, and a deployment documentation level to create a consolidated natural language documentation;

summarize multiple sentences of the first natural language documentation into a first abstract summary of the source code file;

summarize multiple sentences of the consolidated natural language documentation into a second abstract summary of the source code documentation file; and compare the first abstract summary and the second abstract summary to generate a combined match score, wherein the combined match score identifies a validation metric associated with the source code file and the source code documentation file.

20. The non-transitory computer-readable storage media of claim 19, wherein the instructions further cause the one or more processors to:

generate a first numeric mapping of the first abstract summary generate a second numeric mapping of the second abstract summary;

measure a numeric similarity between the first numeric mapping and the second numeric mapping; and generate the combined match score based on the numeric similarity.

* * * * *